United States Patent [19]

Kamiguchi

[11] Patent Number: 4,975,227
[45] Date of Patent: Dec. 4, 1990

[54] METHOD FOR REMOVING CLOGGING OF A NOZZLE IN A MOTOR-DRIVEN INJECTION MOLDING MACHINE

[75] Inventor: Masao Kamiguchi, Oshino, Japan

[73] Assignee: Fanuc Ltd., Minamitsuru, Japan

[21] Appl. No.: 343,262

[22] PCT Filed: Sep. 2, 1988

[86] PCT No.: PCT/JP88/00884
§ 371 Date: Apr. 14, 1989
§ 102(e) Date: Apr. 14, 1989

[87] PCT Pub. No.: WO89/01861
PCT Pub. Date: Mar. 9, 1989

[30] Foreign Application Priority Data

Sep. 4, 1987 [JP] Japan ................... 62-220430

[51] Int. Cl.$^5$ ............. B29C 45/24; B29C 45/76
[52] U.S. Cl. ............................ 264/39; 264/40.1; 264/40.5; 425/136; 425/149; 425/154; 425/155
[58] Field of Search ............ 264/39, 40.1, 40.5, 264/328.1; 425/135, 136, 149, 154, 155, 159, 166, 225; 364/476

[56] References Cited

U.S. PATENT DOCUMENTS 4,816,196 3/1989 Otake .................... 425/135
4,851,171 7/1989 Shimizu et al. .......... 425/135

FOREIGN PATENT DOCUMENTS 57-75833 5/1982 Japan .
59-175393 10/1984 Japan .

Primary Examiner—Jill L. Heitbrink
Attorney, Agent, or Firm—Staas & Halsey

[57] ABSTRACT

A method for removing resin clogging a nozzle in a motor-driven injection molding machine, which is capable of removing resin clogged in the nozzle without an excessive load being continuously applied to a servomotor for driving a screw.

When the nozzle is clogged with resin, pulse distribution to a servo-circuit is started to move the screw to a foremost position thereof (S1). If a feed stop state, wherein the pulse distribution is stopped by an increase of the deviation of an actual movement amount from a command movement amount for the servomotor above a predetermined value, is not ended before passage of a time set by a timer started at the time the feed stop state occurs (S3–S6), the forward movement of the screw is stopped by an alarm process (S7).

8 Claims, 2 Drawing Sheets

METHOD FOR REMOVING CLOGGING OF A NOZZLE IN A MOTOR-DRIVEN INJECTION MOLDING MACHINE

BACKGROUND OF THE INVENTION (a) Field of the Invention

The present invention is directed to a method for removing resin clogged in a nozzle of a motor-driven injection molding machine by moving forward a screw of the machine. More particularly, the present invention is directed to a method of this kind adapted to protect a servomotor for driving the screw from being overloaded.

(b) Description of the Related Art

While an injection molding machine is operated, there are occasions when molten resin is cooled and solidified in a nozzle and finally clogs the nozzle. This prevents continuation of injection molding cycles. Particularly in the case where retracting of the nozzle, or a so-called sprue break, is not performed in each injection molding cycle to set the nozzle apart from the mold. The nozzle is readily cooled by the mold contacting the nozzle, resulting in solidification of molten resin at the distal end of the nozzle and hence clogging of the same.

Measures conventionally taken to remove the solidified resin when the nozzle becomes clogged are to disassemble the nozzle, or move the screw forward through manual operation of an injection mechanism to discharge the solidified resin by applying a high pressure thereto.

If the latter-mentioned method for removing the resin in the clogged nozzle is applied to a hydraulic injection molding machine, no particular problems will arise. However, if this method is used with an injection molding machine using a motor, e.g., a servomotor, as the driving power source of the injection mechanism, an excessive load may be placed on the motor when the resin clogged in the nozzle is discharged. On such occasions, a large current flow occurs in the motor for a long period of time. Thus, the motor and the components of an electronic circuit for driving the motor, e.g., power transistors, will have shortened lives or be destroyed.

SUMMARY OF THE INVENTION

The object of the present invention is to provide a method for removing resin clogging a nozzle in a motor-driven injection molding machine, which is capable of discharging resin in the nozzle without an excessive load being continuously applied to a servomotor for driving a screw.

To achieve the above object, the present invention provides a method for removing resin clogging a nozzle in a motor-driven injection molding machine, which comprises the steps of moving a screw forward toward a predetermined axial position at which resin clogged in the nozzle is ensured to be discharged, by actuating a servomotor for driving the screw judging whether the servomotor is in an overload state, during the forward movement of the screw, and definitely stopping the forward movement of the screw when the overload state of the servomotor continues over a predetermined period of time.

Preferably, the method of the invention further comprises the steps of temporarily stopping the forward movement of the screw when the servomotor is judged to be in an overload state, and terminating the temporary stoppage of the forward movement of the screw when the servomotor is released from the overload state, before passage of the predetermined period of time after the temporary stoppage of the forward movement of the screw.

Thus, according to the present invention, the forward movement of the screw is stopped when the servomotor continuously undergoes an overload state for the predetermined time while being actuated to move the screw forward for discharging resin clogged in the nozzle. Clogging of the nozzle can therefore be removed without an excessive load being continuously applied to the servomotor, and the servomotor and the components of an electronic circuit for actuating the servomotor can be protected and thus prolonged in their service life.

DESCRIPTION OF THE PREFERRED EMBODIMENT

Figure 2:
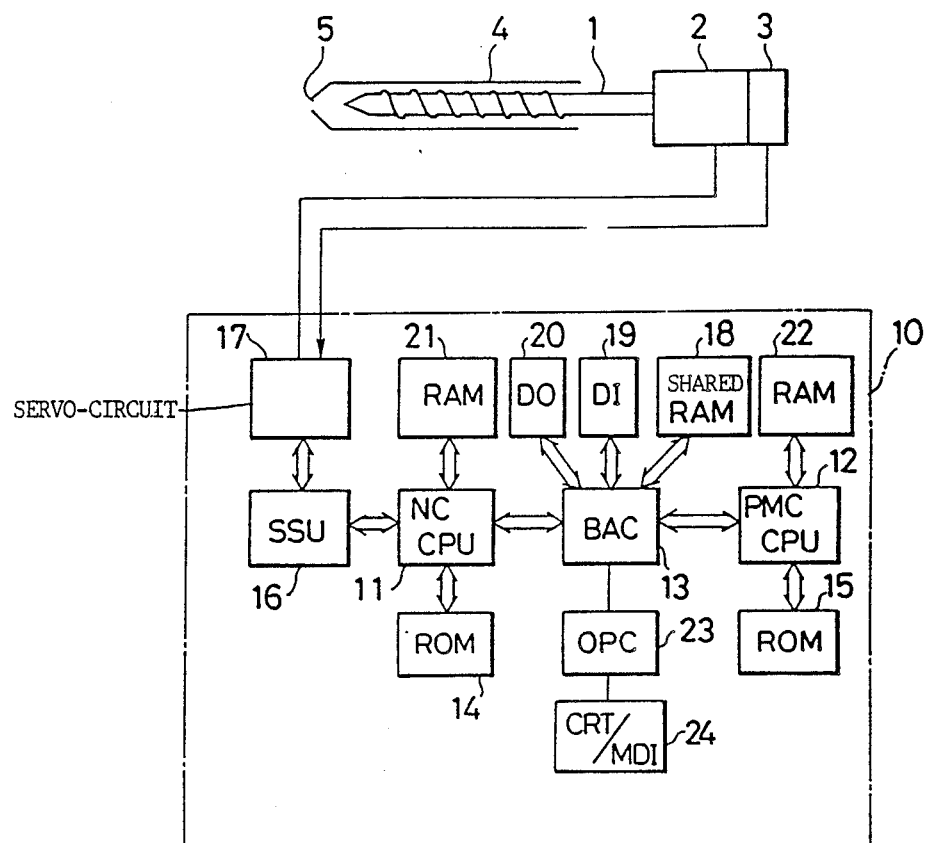
FIG. 2 is a block diagram of a principal part of a motor-driven injection molding machine to which is applied the nozzle clogging removal method according to the embodiment of FIG. 1.

Referring first to FIG. 2, a motor-driven injection molding machine comprises a screw 1 disposed in a heat cylinder 4 having a nozzle 5 at the distal end thereof. The screw 1 is coupled to a servomotor 2 for injection by means of a transmission device (not shown), in such a manner that it is axially movable with rotation of the motor 2. A position sensor, e.g., a pulse coder 3, is mounted to the motor shaft of the servomotor 2, to detect the rotational position of the motor and, accordingly, the axial position of the screw 1.

The injection molding machine is provided with a control system, for example, a numerical control system (hereinafter referred to as "NC system") 10 which includes a microprocessor (hereinafter referred to as "CPU") 11 for the NC system, and a CPU 12 for a programmable machine controller (hereinafter referred to as "PMC"). To the PMC CPU 12 are connected a ROM 15 for storing sequence programs such as a program for a clogging removal process described hereinafter, and a RAM 22 used for temporary storage of data and the like. Connected to the NC CPU 11 are a ROM 14 for storing a monitor program for global control of the injection molding machine, and a RAM 21 used for temporary storage of data and the like. Servo-circuits for controlling the operation of individual servomotors for various axes, such as an injection axis, a mold clamping axis, a screw rotation axis, and an ejector axis, an injection unit axis, are also connected to the NC CPU 11 through a servo-interface 16. Among these, FIG. 2 illustrates only the servomotor 2 for injection and the associated servo-circuit 17. A nonvolatile shared RAM 18, comprising a bubble memory or CMOS memory, serves to store an NC program for controlling various operations of the injection molding machine, various setting values, parameters and the like. Connected to a bus arbiter controller (hereinafter referred to as "BAC") 13 are respective buses of the NC CPU 11, PMC CPU 12, shared RAM 18, input circuit 19, and output circuit 20. The BAC 13 is adapted to control buses to be used. Also connected to the BAC 13 through an operator panel controller 23 is a manual data input device with a CRT display (hereinafter referred to as "CRT/MDI") 24.

In the following, a nozzle clogging removal operation of the injection molding machine constructed as above will be explained.

Figure 1:
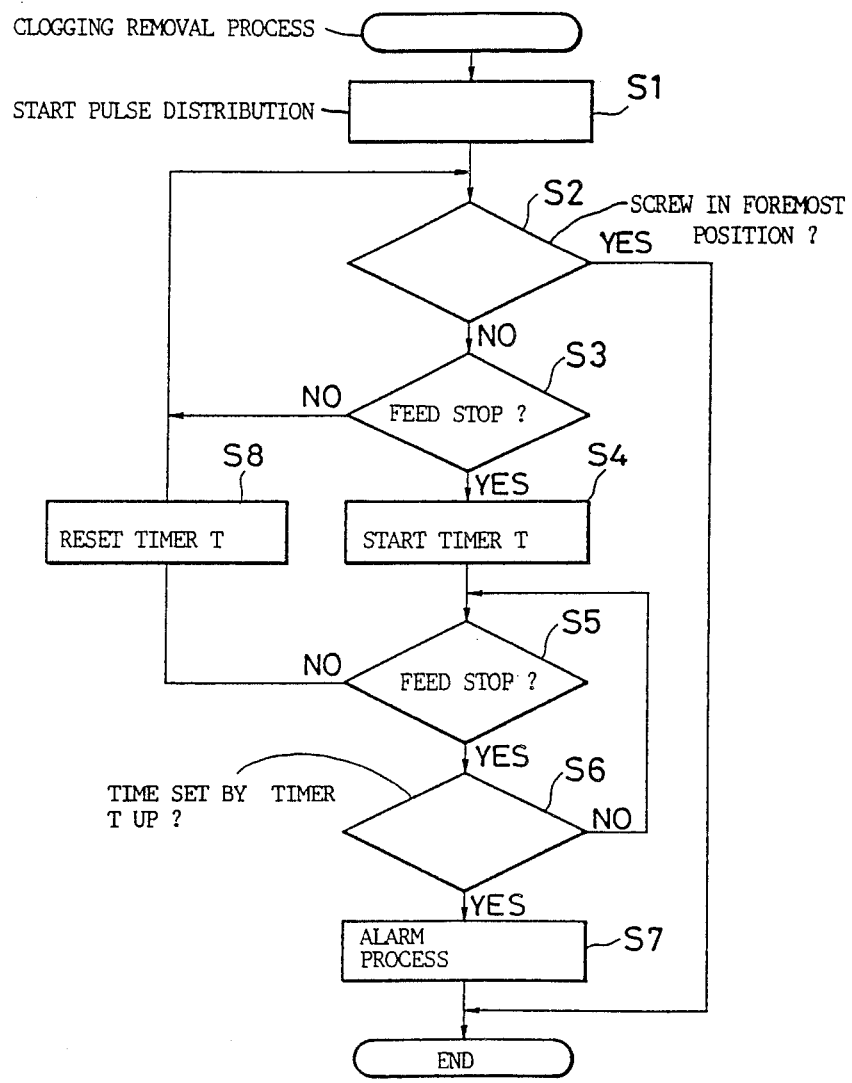
FIG. 1 is a flowchart of a control program for executing a nozzle clogging removal method according to one embodiment of the invention.

When the nozzle 5 becomes clogged with resin, an operator inputs an injection unit retraction command through the CRT/MDI 24, to detach the nozzle 5 from a mold (not shown). The operator then inputs a nozzle clogging removal command through the CRT/MDI 24, and in response to this command, a process for removing resin clogging the nozzle, shown in FIG. 1, is started.

On receiving the above command, the PMC CPU 12 delivers movement command data to the NC CPU 11 through the BAC 13 and the shared RAM 18, to move the screw 1 to a predetermined axial position, preferably the foremost position thereof. Resin clogged in the nozzle 5 is therefore ensured to be discharged. The NC CPU 11 reads this movement command data, and then starts delivery of a command pulse train (command movement amount), i.e., distribution of pulses, to move the screw to the foremost position (Step S1). Each command pulse from the CPU 11 is supplied to an error register in the servo-circuit 17 through the servo-interface 16. In response to each pulse, the value stored in the register is updated in an incremental direction. The servo-circuit 17 drives the servomotor 2 for rotation with a driving current corresponding to the register value, thereby moving the screw 1 forward. The output pulses from the pulse coder 3, generated upon rotation of the motor, are supplied to the error register, and the register value is updated in a decremental direction each time the pulse is applied to the register. Therefore, the register value represents the deviation of the actual movement amount of the servomotor 2 from the command movement amount supplied thereto up to the current point of time. If the forward movement of the screw 1 is delayed or hindered by resin clogged in the nozzle 5, the distribution pulses are accumulated in the error register and the register value is increased. As a result, the output torque of the servomotor 2 increases, so that the screw 1 pushes the resin with an increased force.

Following Step S1, the CPUs 11 and 12 execute the below-mentioned steps repeatedly.

The NC CPU 11 judges whether or not the screw 1 has reached the foremost position (Step 2). More specifically, when the pulse distribution up to the foremost screw position has been completed and at the same time the value of the error register is within a predetermined in-position range, the CPU 11 judges that the foremost position has been reached. The CPU 11 then sends a signal representing this to the PMC CPU 12 through the BAC 13 and the shared RAM 18. On receiving the signal representing arrival at the foremost position, the CPU 12 judges that the resin clogged in the nozzle 5 is already discharged, because, the screw 1 has reached the foremost position. Accordingly ends the clogging removal process ends.

If it is judged in Step S2 that the screw 1 has not reached the foremost position, a decision is made as to whether a signal requesting a feed stop has been delivered (Step S3). As mentioned above, when the forward movement of the screw 1 is delayed or hindered by the resin clogged in the nozzle 5, the force of pushing the resin is increased. If the resin still continues to delay or hinder the forward movement of the screw, the value of the error register increases above a predetermined value, which is set previously and represents an overload state of the servomotor 2. The injection molding machine of this embodiment has a feed stop function of interrupting the pulse distribution on such occasions. During execution of the feed stop function, NC CPU 11 sends a feed stop indication signal to the PMC CPU 12 through the BAC 13 and the shared RAM 18.

On receiving the feed stop indication signal, the PMC CPU 12 starts a timer T (Step S4), and repeats a decision as to whether the feed stop indication signal is still being supplied from the NC CPU 11 (Step S5), and decides whether the time set by the timer T is up (Step S6). While in the feed stop state, the value of the error register is large and thus a large current flows in the servomotor 2. Accordingly, the motor actuates the screw 1 with the maximum output torque, so that the screw 1 pushes the resin clogged in the nozzle 5 with a large force. As a result, the value of the error register may be decreased below the aforementioned predetermined value to terminate the feed stop function, before passage of time set by the timer T, i.e., before passage of a maximum allowable period in which the motor and the components of the servo-circuit 17, etc., are not endangered even if an overload state permitting a large current flow in the servomotor 2 continues. In such case, the PMC CPU 12 resets the timer T (Step S8), and repeats the process of Step S2 and subsequent steps. If the feed stop is again requested before the screw 1 reaches the foremost position, the PMC CPU 12 starts the timer T and repeats execution of Steps S5 and S6 as mentioned above. If the feed stop state is ended before the time set by the timer T passes (Step 5), the timer T is reset (Step S8) and the program returns to Step S2. If the screw 1 reaches the foremost position during execution of these steps, then it is judged that the nozzle 5 is unclogged and accordingly the nozzle clogging removal process is ended.

If it is judged in Steps S5 and S6 that the feed stop state is continued until the time of timer T passes, an alarm process is performed. An alarm is displayed on the CRT screen of the CRT/MDI 24 and the actuation of the servomotor 2 is stopped (Step S7).

As mentioned above, the time within which a large current is allowed to continuously flow in the servomotor 2 is restricted to the time set by the timer T. This restricted time is set to such a safe time period that the servomotor 2 and electronic components for driving the servomotor 2, such as power transistors and the like, are never endangered even if the large current continues to flow. Therefore, the servomotor and the electronic components can be protected from being damaged and having their lifetimes shortened.

Meanwhile, when the feed stop occurs once but is ended afterwards, that is, when the resin clogged in the nozzle 5 is removed, no further greater force is usually required thereafter to remove the clogged resin. Therefore, the feed stop state is hardly ever repeated.

In the foregoing embodiment, an NC system is used as the control system for controlling the injection molding machine, and the feed stop function of the NC system is utilized. A similar process to the above-described one can be also applied to an injection molding machine which is controlled by a microcomputer or the like, to remove resin clogged in the nozzle.

I claim:

1. A method for removing resin clogging of a nozzle in a motor-driven injection molding machine, comprising the steps of:
   (a) moving a screw forwardly toward a predetermined axial position at which resin clogged in the nozzle is discharged, by actuating a servomotor for driving the screw;
   (b) determining whether the servomotor is in an overload state during forward movement of the screw in said step (a); and
   (c) stopping the forward movement of the screw in said step (a) when the overload state of the servomotor continues for a predetermined period of time.

2. A method according to claim 1, further comprising the steps of:
   (d) temporarily stopping the forward movement of the screw in said step (a) when the servomotor is determined by said step (b) to be in an overload state; and
   (e) terminating the temporary stoppage of the forward movement of the screw in said step (d) when the servomotor is released from the overload state before passage of the predetermined period of time after the temporary stoppage of the forward movement of the screw in said step (d).

3. The method according to claim 1, wherein the predetermined axial position of the screw is a foremost position thereof.

4. The method according to claim 2, wherein said step (a) comprises the substep of delivering a movement command to the servomotor to actuate the servomotor, wherein said step (b) comprises the substep of determining that the servomotor is in an overload state when a deviation of an actual movement amount of the servomotor from a command movement amount for the servomotor is above a predetermined value, and wherein said steps (c) and (d) comprise the substeps of, respectively, stopping and interrupting the delivery of the movement command to temporarily stop the forward movement of the screw.

5. A method according to claim 4, wherein said step (d) further comprises the substeps of starting a timer for setting a time corresponding to the predetermined period of time, simultaneously with the temporary stoppage of the forward movement of the screw, and terminating the temporary stoppage of the forward movement of the screw when the deviation becomes smaller than the predetermined value before the passage of time set by the timer.

6. A method according to claim 1, wherein said step (c) comprises the substeps of performing an alarm indication simultaneously with the stoppage of the forward movement of the screw.

7. A method according to claim 2, wherein said predetermined axial position of the screw is a foremost position thereof.

8. A method according to claim 2, wherein said step (c) comprises the substep of performing an alarm indication simultaneously with the stoppage of the forward movement of the screw.

* * * * *

UNITED STATES PATENT AND TRADEMARK OFFICE
CERTIFICATE OF CORRECTION

PATENT NO. : 4,975,227
DATED : December 4, 1990
INVENTOR(S) : Masao Kamiguchi, et al It is certified that error appears in the above-identified patent and that said Letters Patent is hereby corrected as shown below:

FRONT PAGE [75] Inventor: "Oshino" should be --Minamitsuru--.

Col. 3, line 58, "discharged," should be --discharged--;
      line 59, delete "ends".

Signed and Sealed this

Twenty-eighth Day of April, 1992

Attest:

HARRY F. MANBECK, JR.

*Attesting Officer*      *Commissioner of Patents and Trademarks*